United States Patent [19] [11] 4,036,882
Bertozzi et al. [45] July 19, 1977

[54] AMINE FORMAL POLYMERS AND PROCESS OF MAKING THE SAME

[75] Inventors: Eugene R. Bertozzi, Yardley, Pa.; Robert Barclay, Jr., Trenton, N.J.; David H. Packer, Yardley; Daniel J. Smith, Washington Crossing, both of Pa.

[73] Assignee: Thiokol Corporation, Newtown, Pa.

[21] Appl. No.: 441,938

[22] Filed: Feb. 13, 1974

[51] Int. Cl.² .................. C07C 93/02; C07C 85/04
[52] U.S. Cl. .................. 260/584 B; 260/47 EN; 260/585 A
[58] Field of Search .................. 260/584 B, 585 A

[56] References Cited

U.S. PATENT DOCUMENTS

| | | | |
|---|---|---|---|
| 2,325,514 | 7/1943 | Hester | 260/585 A |
| 2,355,337 | 8/1944 | Spence | 260/585 A |
| 2,560,280 | 7/1951 | De Benneville | 260/584 B |
| 3,070,552 | 12/1962 | Tesoro et al. | 260/584 B |
| 3,372,129 | 3/1968 | Phillips | 260/585 A |
| 3,654,370 | 4/1972 | Yeakey | 260/584 B |

FOREIGN PATENT DOCUMENTS

994,683   6/1965   United Kingdom ............ 260/584 B

*Primary Examiner*—Daniel E. Wyman
*Assistant Examiner*—John J. Doll

[57] ABSTRACT

A novel group of amine formal polymers of the general formula:

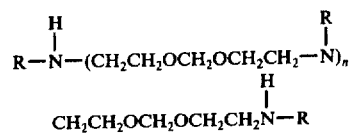

wherein R is hydrogen, —CH₂R" or

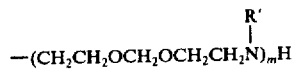

R' is hydrogen or —CH₂R" and R" is hydrogen, alkyl or hydroxyalkyl, $n$ is 1 to 8, $m$ is 0 to 8 and R, R', and R" may be the same or different. The polymers may be prepared by reacting bis(haloethyl)formals with ammonia or primary amines and/or monoalkanolamines in the presence of aqueous alkali. The products may be used as, e.g., rust inhibitors, acid scavengers, antioxidants and epoxide and urethane curing catalysts. Certain of the polymers are especially useful as epoxide curing agents.

10 Claims, No Drawings

AMINE FORMAL POLYMERS AND PROCESS OF MAKING THE SAME

This invention relates to a novel group of amine formal polymers having primary amine, secondary amine, tertiary amine and/or hydroxylamine groups spaced along the polymer chains thereof. The polymers may be prepared from bis(2-haloethyl)formals, such as bis(2-chloroethyl)formal (BCEF), and ammonia, primary amines or monoalkanolamines and may be viscous liquids or solids depending upon the degree of polymerization thereof.

It is known as disclosed in, for example, U.S. Pat. No. 2,560,280, that bis(2-haloethyl)formals can be reacted with secondary amines to produce diamines that can be subsequently reacted with alkylbenzyl halides. However, so far as we are aware, the reaction of such formals with primary amines, ammonia and/or monoalkanolamines to produce polymeric products has not previously been disclosed.

The amine formal polymers of the present invention may be represented by the following general formula:

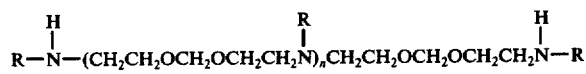

wherein R is hydrogen, —CH$_2$R" or

R' is hydrogen or —CH$_2$R" and R" is hydrogen, alkyl or hydroxyalkyl, $n$ is 1 to 8, $m$ is 0 to 8 and R, R' and R" may be the same or different.

In general, the polymers can be prepared by reacting a bis(2-haloethyl)formal, preferably bis(2-chloroethyl)formal, with an excess of the amine or ammonia in water or a watermiscible organic solvent and in the presence of aqueous alkali. The amines used are preferably primary alkylamines or monohydroxyalkyl amines having say 1 to 6 carbon atoms, e.g., methylamine, ethylamine, propylamine, butylamine, isobutylamine, monoethanolamine, and monopropanolamine. While bis(2-chloroethyl)formal is the preferred formal and is used for illustrative purposes in the following description, the corresponding bromoethyl, fluoroethyl or iodoethyl formals can also be used.

The polymers can be prepared by either a one-step or two-step process. In the former process the polymer is prepared directly by the reaction of the formal with ammonia or the amine, whereas in the latter process the amine and bis-chloroethyl formal are first reacted to form a disecondary amine, e.g.,

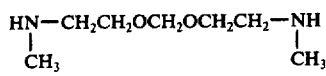

which is then reacted with a further quantity of chloroethyl formal to form the desired polymer. Both the one-step and two-step processes are illustrated in the Examples given below.

The polymerization may be carried out by heating the amine or ammonia and bis-haloethyl formal in the presence of an aqueous alkali capable of reacting with the halogen terminals of the BCEF to form a halide salt, at a temperature of say 50° to 120° C., usually at the reflux temperature, for a period of say 5 to 25 hours. It is usually desirable that a molar excess of the amine or ammonia be used. Thus the molar ratio of amine or ammonia to bis-haloethyl formal may vary from about 1:1 to 10:1 or higher. The nature and amount of the aqueous alkali used is not critical, provided that a sufficient amount is present to react with the halogen terminals of the bis(haloethyl)formal. Aqueous alkali metal hydroxides and carbonates, e.g., sodium hydroxide and carbonate are typically used. Ordinarily the amount of alkali used is approximately that stoichiometrically required to react with the halide terminals of the formal.

The halide salt formed as an incident of the reaction may be removed from the reaction mixture by filtration and the water removed by azeotropic distillation with, e.g., toluene. The residue is then distilled at reduced pressure to yield an amine formal oligomer or polymer having a molecular weight of say 250 to 5000. The product as thus obtained, if made with ammonia, may contain a certain proportion of diprimary amine, and if made with an amine, may contain a certain proportion of disecondary amine. For some applications this monomeric material need not be removed, whereas for other applications, as more fully discussed below, separation of monomeric diamine is desirable.

The products of the invention may be used for a wide variety of purposes. Thus they may be used as rust inhibitors, acid scavengers, anti-oxidants, emulsifying and wetting agents, catalysts in the production of urethane elastomeric and rigid foams and casting compounds, epoxy resin curing catalysts and wet paper strength improvers. The products containing reactive hydroxyl groups can be used as co-curing amine polyols in the production of polyurethanes to provide extra branching and cross-linking.

It has been found that the reaction products of ammonia and bis-chloroethyl formal having the following general formula are particularly useful as epoxide curing agents:

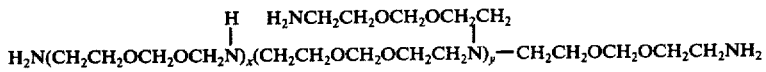

wherein $x$ is 1 to 8 and $y$ is 0 to 8.

As pointed out above, such products as initially produced usually contain a certain amount of monomeric diamine formal. While the product containing the monomeric diprimary amine formal can be effectively used as an epoxy curing agent, curable epoxy compositions containing such products as a curing agent exhibit a relatively high exotherm. However, it has been found that the utility of the initial reaction product as an epoxide curing agent can be substantially improved if it is stripped or topped by distillation at a reduced pressure to remove some or all of the monomeric diprimary amine therefrom. The residual polymer to be used as an epoxide curing agent desirably has a primary amine content, expressed as nitrogen, of about 5 to 7% by weight. When such a topped product is used as an epoxy curing agent, the curing composition exhibits an exotherm only slightly above ambient temperature and a pot life of say 3 to 5 hours. Even though the exotherm is slight and the pot life is relatively long, curing of the epoxide is effected within 24 hours at room temperature. Thus this topped product is especially useful in forming large sections of cured epoxides.

In order to point out more fully the nature of the present invention, the following examples are given of procedures for making amine formal polymers embodying the invention and the polymers thus produced. In those examples using water as a solvent, deionized water was employed.

EXAMPLE 1

One-step preparation of a polymer from BCEF and methylamine

A 2-liter, three-necked flask equipped with a mechanical stirrer, a thermometer, an inlet for nitrogen gas, a dropping funnel, and a reflux condenser capable of condensing methylamine (b.p. −7° C.) was charged with 173 g. (1.00 mole) of bis(2-chloroethyl)formal (BCEF) and a solution of 32.6 g. (1.05 mole) of methylamine in 400 g. of water. The mixture was heated over a 37-minute period to 74° C. and was held at 74°-75° C. for 15 minutes. Thereafter a solution of 80.2 g. (2.00 moles) of sodium hydroxide (assay 99.8%) in 100 ml. of water was added slowly over a period of 1.4 hours while the temperature was maintained at 70°-75° C.

The dropping funnel was then rinsed with 30 ml. of water and the mixture was heated for 3 hours at 69°-77° C., 1 hour at 72°-91.5° C., 16.5 hours at 91.5°-96° C., and 2.3 hours at 102°-104° C. Thereafter the temperature was reduced to about 70° C., 400 ml. of toluene added, and the mixture dehydrated by azeotropic distillation to a final pot temperature of 100° C. The residue was filtered and the solids were washed with toluene. Upon removal of the toluene from the combined filtrate by vacuum distillation to a pot temperature of 125° C. at 0.08 mm. pressure, 108.6 g. of liquid polymer was obtained. Analytical data on the composition of the polymer are given in Table I below. The primary amine content as given in Table I was determined by the 2,4-pentanedione titration method described by F. E. Critchfield, "Organic Functional Group Analysis," Macmillan, New York, 1963, pp. 36–38.

EXAMPLE 2

Two-step Preparation of a polymer from BCEF and n-butylamine

To a solution of 330 g. (4.51 moles) of n-butylamine in 380 ml. of water, maintained at 55°-59° C., 156 g. (0.90 mole) of BCEF was added over a 22-minute interval. The resulting solution was heated quickly to the reflux temperature and heated under reflux at 89°-96° C. for 11.5 hours. It was cooled, neutralized by the addition of a solution of 72 g. (1.80 moles) of sodium hydroxide in 80 ml. of water, and dehydrated by heating under vacuum to a pot temperature of 93° C. at about 150 mm. pressure. The residue was filtered to remove NaCl crystals. Fractional distillation of the filtrate gave 125.0 g. (56.5%) of bis(2-n-butylaminoethyl)formal, b.p. 108°-118° C./0.5 mm., $n_D^{25}$ 1.4425–1.4434. A center cut, b.p. 109°-108° C./0.6–0.55 mm., $n_D^{25}$ 1.4425, was segregated for reaction with a further quantity of BCEF.

A mixture of 24.6 g. (0.100 mole) of this center cut diamine, 17.3 g. (0.100 mole) of BCEF, and 100 ml. of water was heated under reflux for 1 hour. To the boiling mixture a solution of 8.0 g. (0.20 mole) of sodium hydroxide in 50 ml. of water was added over 1.7 hours. The dropping funnel was rinsed with 10 ml. of water, and the resulting solution was heated under reflux for 16 hours. The resulting product was worked up with toluene (160 ml.) in a manner similar to that described in Example 1, with final stripping to a pot temperature of 177° C. at 0.15 mm. pressure. The yield of polymer was 34.3 g. Analytical data on this product are given in Table I below.

EXAMPLE 3

Two-step preparation of a polymer from BCEF and methylamine

A 3-liter flask equipped as in Example 1 was charged with 346.1 g. (2.00 moles) of BCEF and a solution of 372 g. (12.0 moles) of methylamine in 560 ml. of water. The mixture was heated to the reflux temperature (51° C.) over 35 minutes, and then heated under reflux for 8.5 hours, the temperature rising gradually to 69° C. It was then cooled, neutralized by the addition of a solution of 160 g. (4.00 moles) of NaOH in 180 ml. of water, heated to 100° C. to expel the excess dimethylamine, and then heated under reduced pressure to 101° C./103 mm. The residue was filtered, and the NaCl crystals were washed with toluene. Fractional distillation of the filtrate gave 129.2 g. (40%) of bis(N-methylaminoethyl)formal.

A mixture of 32.4 g. (0.200 mole) of this diamine, 34.6 g. (0.200 mole) of BCEF, and 200 ml. of water was heated under reflux at 99°-99.5° C. for 2 hours. A solution of 16.05 g. (0.400 mole) of NaOH (99.8% assay) in 100 ml. of water was added over 2 hours at 98.5°-100° C. The dropping funnel was then rinsed with 20 ml. of water, and the mixture was heated under reflux for an additional 18 hours. The resulting mixture was worked up with toluene (200 ml.) in a manner similar to that described in Example 1, with final stripping to a pot temperature of 135° C. at 0.08 mm pressure. The yield of polymer was 49.1 g. Analytical data on the product are given in Table I below.

EXAMPLE 4

Preparation of a polymer from BCEF and ammonia (methanol solution)

Methanol (425 g.) and BCEF (346 g.; 2.00 moles) were charged to a stirred 1-gallon stainless steel autoclave. The autoclave was purged with nitrogen, pressure tested and charged with 204 g. (12 moles) of anhydrous ammonia. The contents of the autoclave were heated for 5 hours at 100° C. during which time the pressure rose to 350 psig and thereafter remained constant. The autoclave was then cooled and vented and the reaction product transferred to a beaker and neutralized with a solution of 160 g. (4.00 moles) of NaOH in 160 ml. of water. The liquid was decanted into a flask, and the unreacted ammonia and about 250 ml. of methanol were removed by distillation. Then a solution of the precipitated sodium chloride in 500 ml. of water was added, and distillation was continued through a Vigreux column until the head temperature reached 100° C. Toluene (500 ml.) was added to the cooled residue, water was removed by azeotropic distillation, the residue was filtered and the solids washed with toluene. The combined toluene solution was stripped to a pot temperature of 100° C. at 40 mm. pressure. The residue was fractionally distilled to remove 26.0 g. of monomeric diamine, b.p. 65-83 C./1.0-1.7 mm. The residue comprised 148.4 g. of polymer. Analytical data on the polymer are given in Table I below.

EXAMPLE 5

Preparation of a polymer from BCEF and ammonia (water solution)

A 2-liter, three-necked flask equipped with a mechanical stirrer, a thermometer, a dropping funnel, and a water-cooled reflux condenser was charged with 294.2 g. (1.70 moles) of BCEF and a solution of 174 g. (10.2 moles) of ammonia in 975 ml. of water. The mixture was heated over 1 hour to 53° C., at the end of which time the condenser was stoppered loosely with a cork. Heating was continued for 46 hours at 50° C., 97 hours at 60° C. and 71 hours at 70° C. At this point all of the BCEF had dissolved, except for a small amount of a dense semi-solid material. The mixture was cooled to about 58° C., neutralized by the gradual addition of a solution of 136 g. (3.40 moles) of NaOH in 160 ml. of water, and heated to 100° C. to effect removal of most of the excess ammonia. The residue was cooled and filtered to remove the insoluble material (about 13 g.). Toluene (500 ml.) was added to the filtrate, which was then dehydrated by azeotropic distillation to a pot temperature of 115° C. Finally toluene was removed by distillation to a pot temperature of 130° C. at 9 mm. pressure. The yield of polymer was 192.7 g. Analytical data are given in Table I below.

Table I

| Example No. | 1 | 2 | 3 | 4 | 5 |
|---|---|---|---|---|---|
| Amine Content, as % N | | | | | |
| Primary | none | none | none | 6.59 | 7.96 |
| Primary + Secondary | 0.81 | 2.13 | 1.44 | 12.24 | 11.97 |
| Tertiary | 8.02 | 5.94 | 7.89 | 1.74 | 2.11 |
| Total | 9.09 | 7.95 | 9.58 | 13.65 | 14.07 |
| Chlorine, % | 0.50 | 2.56 | 2.05 | none | 0.02 |
| Water, % | 0.45 | — | 0.41 | 0.11 | 0.61 |
| Total Acetylatables[1] | 104.7 | — | 103.4 | — | — |
| Molecular Weight[2] | 900 | 730 | 960 | 449 | 293 |
| Average Groups per Molecule[3] | | | | | |
| Primary Amine | none | none | none | 2.11 | 1.67 |
| Secondary Amine | 0.52 | 1.11 | 0.99 | 1.81 | 0.84 |
| Tertiary Amine | 5.2 | 3.1 | 5.4 | 0.56 | 0.44 |
| Chlorine | 0.13 | 0.53 | 0.56 | none | 0.002 |
| Hydroxyl | 1.16 | — | 0.78 | — | — |

[1]These determinations were carried out according to the standard procedure for hydroxyl number (corrected) and are reported as mg KOH per gram of sample. This test presumably measures both -OH and $R_2$N-H.
[2]By vapor phase osmometry (VPO) in benzene.
[3]Calculated from chemical analyses and $M_n$(VPO).

EXAMPLE 6

One-step preparation of a polymer from BCEF and monoethanolamine

A 3000 ml. flask was charged with 800 cc. of water and 212 g. (2 moles) of anhydrous sodium carbonate. The mixture was agitated until the sodium carbonate had dissolved. Then 134 g. (2.20 moles) of monoethanolamine was added to the pot and the charge heated with agitation to 100° C. At this temperature dropwise addition of 346 g. (2 moles) of BCEF was begun. After approximately 1 hour the formal addition was completed. Then the charge was reacted for 10 hours at reflux temperature (105°-107° C.). The resulting mixture was worked up in a manner generally similar to that described in the preceding Examples to yield a light colored viscous liquid. Analysis of the product gave the following results:

| | |
|---|---|
| Nitrogen | 7.9% |
| Hydroxyl | 15.8% |
| Chlorine | 0.9% |

EXAMPLE 7

Use of an amine formal polymer as a curing agent for an epoxy resin

A quantity of the amine formal of Example 5 was blended by hand with an epoxy resin (bisphenol A diglycidyl ether — ERL-2774) and tested for the properties shown below. Based on an equivalent weight of 70.3 for the polymer and an epoxide equivalent of 190 for the epoxy resin, 37 parts by weight of the polymer were used for curing 100 parts by weight of the epoxy resin. The results obtained were as follows:

| Working Properties of 100 grams of the mixture at 72° F. | |
|---|---|
| Work life, hours | 2.0 |
| Exotherm, ° F. | 300+ |
| Mechanical Properties after curing 7 days at 72° F. | |
| Izod impact, ft-lbs/in of notch | 1.03 |
| Tensile strength, psi | 7730 |
| Elongation, % | 2.3 |
| Hardness, Shore D | 85 |
| Mechanical Properties after aging 3 days at 212° F. | |
| Izod impact, ft-lbs/in. of notch | 0.55 |
| Tensile strength, psi | 6670 |
| Elongation, % | 5.4 |
| Hardness, Shore D | 85 |
| Electrical Properties after curing 7 days at 72° F. | |
| Dielectric constant at 1 Kc | 4.65 |
| Dissipation factor at 1 Kc | 0.011 |
| Volume resistivity, Ωcm | $1.9 \times 10^{14}$ |
| Surface resistivity, Ω | $2.9 \times 10^{11}$ |

EXAMPLE 8

Use of a topped amine formal polymer as a curing agent for an epoxy resin

To a 25 gallon, stirred stainless steel autoclave were charged 33 lbs. of technical bis(2-chloroethyl)formal and 64 lbs. of a 29.4% aqueous ammonia solution. The mole ratio of $NH_3$ to formal was 6:1, based on the analytically determined chlorine content of the formal. The mixture was heated according to the following schedule:

Temperature raised to 175° F. over 3.5 hours; max. pressure 55 psig.
Held at 175° F. for 2 hours.
Temperature raised to 210° F. over 0.5 hour; max. pressure 60 psig.
Held at 210° F. for 10 hours.

The reactor was vented and the mixture was neutralized by the addition of 14.7 lbs. of NaOH (as a 50% solution in water), heated to remove most of the ammonia, and filtered. Toluene (32 lb.) was added, and the solution was dehydrated by azeotropic distillation to a final liquid temperature of 235° F. The residue was filtered to remove NaCl, the salt cake was washed with toluene, and the combined filtrate was stipped to a final liquid temperature of 270° F. at 17 mm. pressure. The yield of polyamines was 15.0 lb. (63%). Analytical data were as follows:

| | |
|---|---|
| Chlorine, % | 0.08 |

| -continued | |
|---|---|
| Water, % | 0.32 |
| Amines, as % N | |
| Primary | 7.95 |
| Secondary | 4.41 |
| Tertiary | 1.69 |

A 1721.6 g. portion of the polyamine mixture was topped in the laboratory by heating it under reduced pressure in two stages. In the first stage the final liquid temperature was 140° C. and the pressure 0.8 mm. The material was allowed to cool to 68° C. and then reheated to 150° C. at 1.45 mm. This operation yielded 1453.3 g. of topped amine formal polymer.

A quantity of the topped amine formal (42.3 parts by weight) was blended by hand with 100 parts of epoxy resin (Union Carbide ERL-2774). The mixture of epoxy resin and topped amine formal polymer exhibited the following properties.

| Working Properties at 72° F. (100-gram Mass) | |
|---|---|
| Work life, hours | 4.8 |
| Exotherm, ° F. | 100 |
| Mechanical Properties, Cured 7 days at 72° F. | |
| Izod impact, ft-lb/in. of notch | 0.36 |
| Tensile strength, psi | 7180 |
| Elongation, % | 2.9 |
| Hardness, Shore D | 85 |
| Mechanical Properties, Aged 3 days at 212° F. | |
| Izod impact, ft-lb/in of notch | 0.83 |
| Tensile strength, psi | 5880 |
| Elongation, % | 6.5 |
| Hardness, Shore D | 88 |
| Electrical Properties, Cured 7 days at 72° F. | |
| Dielectric constant at 1 Kc | 4.29 |
| Dissipation factor at 1 Kc | 0.006 |
| Volume resistivity, ohm-cm | $1.7 \times 10^{14}$ |
| Surface resistivity, ohm | $1.6 \times 10^{14}$ |

A comparison of Examples 7 and 8 shows that the topped product, when used as an epoxy curing agent provided a curing composition exhibiting a substantially reduced exotherm. Hence the topped product is especially useful in preparing large masses of cured epoxides.

It is, of course, to be understood that the foregoing Examples are intended to be illustrative only and that numerous changes can be made in the ingredients, proportions and conditions disclosed without departing from the spirit of the invention as defined in the appended claims.

We claim:

1. An amine formal polymer of the general formula

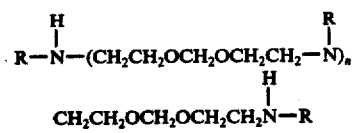

wherein R is hydrogen, —CH₂R" or

R' is hydrogen or —CH₂R" and R" is hydrogen, alkyl or hydroxyalkyl, in which the alkyl groups have 1 to 6 carbon atoms, n is 1 to 8, m is 0 to 8 and R, R' and R" may be the same or different, said polymer having a primary amine content, expressed as nitrogen, of about 5 to 7% by weight.

2. An amine formal polymer according to claim 1 wherein R" is alkyl of 1 to 5 carbon atoms.

3. An amine formal polymer according to claim 1 wherein R" is hydroxyalkyl and the alkyl group has 1 to 5 carbon atoms.

4. An amine formal polymer according to claim 1 having a molecular weight of 250 to 5000.

5. An amine formal polymer of the general formula

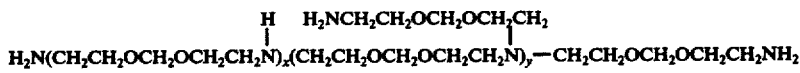

wherein x is 1 to 8 and y is 0 to 8, said polymer having a primary amine content, expressed as nitrogen, of about 5 to 7% by weight.

6. A process for making an amine formal which comprises heating a mixture of bis(haloethyl)formal and ammonia or a primary amine or monoalkanolamine in the presence of aqueous alkali to form an amine formal of the general formula

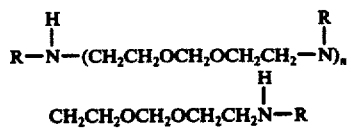

wherein R is hydrogen, —CH₂R" or

R' is hydrogen or —CH₂R" and R" is hydrogen, alkyl or hydroxyalkyl, in which the alkyl groups have 1 to 6 carbon atoms, n is 1 to 8, m is 0 to 8 and R, R' and R" may be the same or different, fractionally distilling the reaction mixture containing the polymer at a reduced pressure and recovering a product fraction having a primary amine content, expressed as nitrogen, of 5 to 7% by weight.

7. A process according to claim 6 wherein the molar ratio of ammonia or amine to bis(haloethylformal) in said mixture is from 1:1 to 10:1.

8. A process according to claim 6 wherein said mixture is heated to a temperature of 50° to 120° C.

9. A process according to claim 6 wherein said amine is selected from primary amines and monoalkanolamines having 1 to 6 carbon atoms.

10. A process according to claim 6 wherein bis(-chloroethyl)formal and ammonia are reacted to form a polymer having the formula

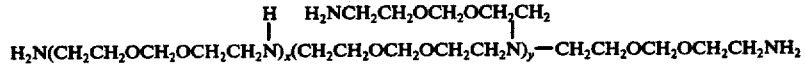

wherein x is 1 to 8 and y is 0 to 8.

* * * * *